April 10, 1945.  G. R. SIMMONS ET AL  2,373,200
APPARATUS FOR TESTING COATING MATERIALS
Filed Oct. 2, 1942   2 Sheets-Sheet 1

INVENTORS
G. R. SIMMONS
H. A. SIMMONS
BY Harry R. Duff
ATTORNEY

April 10, 1945.    G. R. SIMMONS ET AL    2,373,200
APPARATUS FOR TESTING COATING MATERIALS
Filed Oct. 2, 1942    2 Sheets-Sheet 2
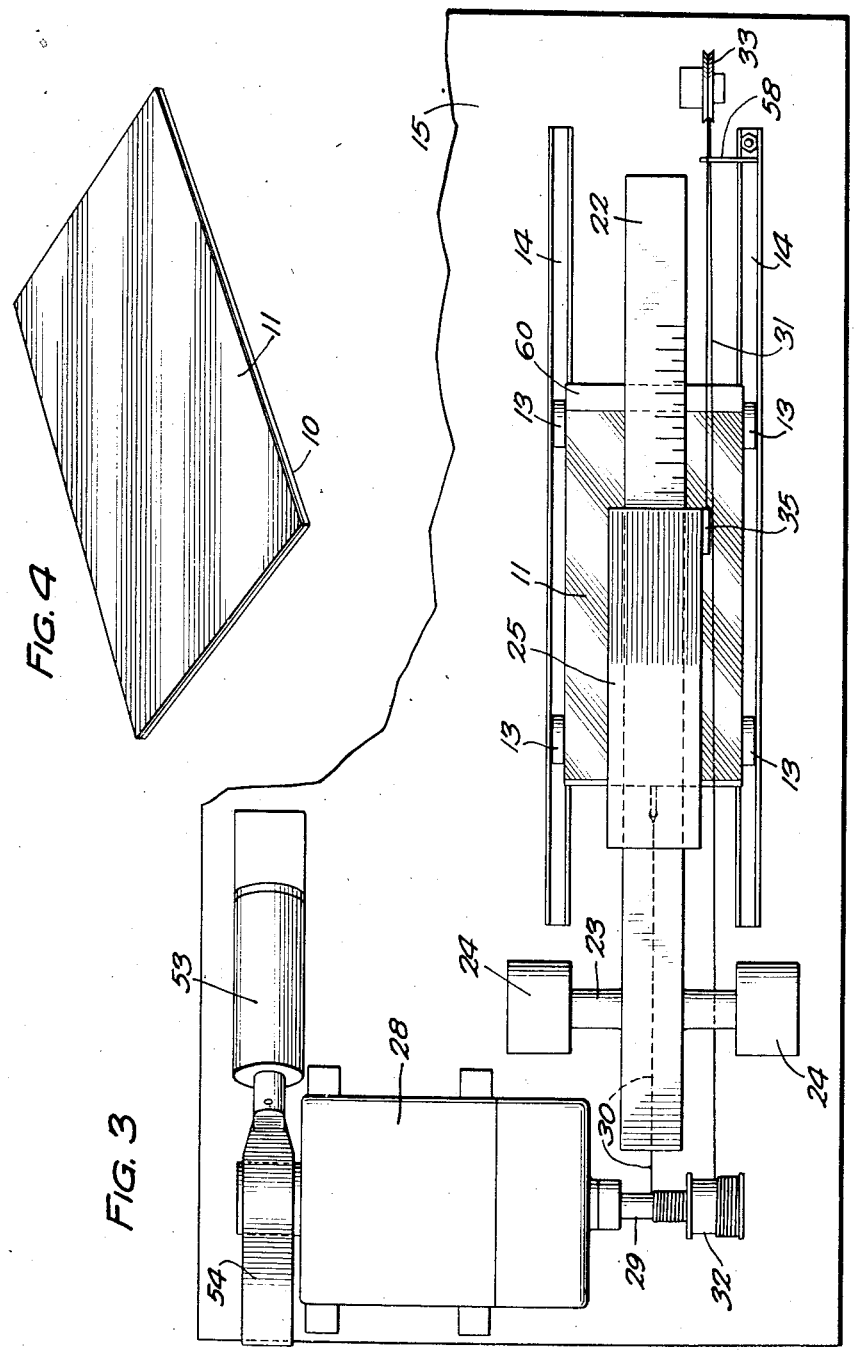
INVENTORS
G. R. SIMMONS
H. A. SIMMONS
BY Harry C. Duft
ATTORNEY Patented Apr. 10, 1945

2,373,200

UNITED STATES PATENT OFFICE 2,373,200

APPARATUS FOR TESTING COATING MATERIALS

Glen R. Simmons and Howard A. Simmons, Chicago, Ill., assignors to Western Electric Company, Incorporated, New York, N. Y., a corporation of New York Application October 2, 1942, Serial No. 460,546

9 Claims. (Cl. 73—150)

This invention relates to apparatus for testing coating materials, and more particularly to apparatus for testing scratch adhesion values of coating materials.

An object of the present invention is to provide an efficient and effective apparatus for testing scratch adhesion values of coating materials.

In accordance with one embodiment of this invention, an apparatus may be provided comprising an electric motor for moving a coated test panel relatively to a stylus while at the same time increasing the pressure exerted on the panel by the stylus. When the stylus penetrates the coating, a circuit is completed to operate a relay which opens the motor circuit and thereby stops the motor. The scratch adhesion value is ascertained by determining the pressure required to penetrate the coating.

Other objects and advantages of the present invention will be apparent from the following detailed description taken in conjunction with the following drawings, wherein:

Fig. 3 is a diagrammatic plan view of the apparatus shown in Fig. 1, and

Fig. 4 is an enlarged perspective view of a coated test panel.

Figure 1:
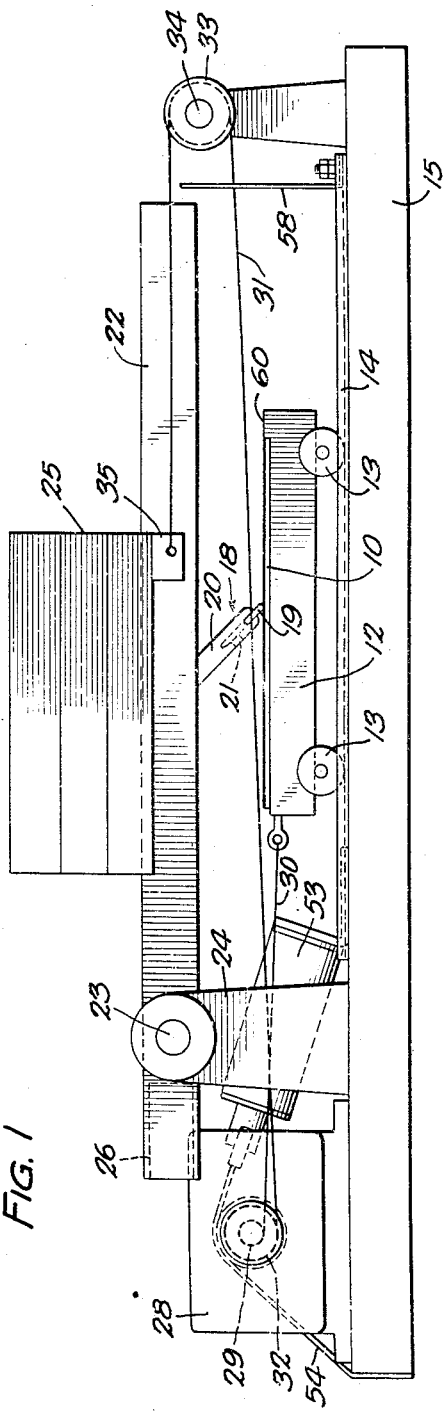
Fig. 1 is a diagrammatic side elevation of a testing apparatus constructed in accordance with this invention.

Referring now to the drawings, a test panel 10, having a coating 11 thereon to be tested, is positioned on a carriage 12. This carriage is made of conducting material and is provided with four metal wheels 13 which run on a pair of metal tracks 14 mounted on a base 15 of the apparatus. The base 15 is preferably made of wood or other insulating material.

A stylus 18, comprising an eyelet screw 19 set in a holder 20 and held in place by a set screw 21, is mounted on the underside of a lever arm 22 so that the eyelet may rest on the coated surface of the test panel. This lever arm is pivotally mounted near one end on a shaft 23 which is supported by two standards 24. The right hand upper surface of the lever arm is graduated, as shown in Fig. 3, and a weight 25, comprising a number of blocks, is slidably positioned on the upper surface. A counter-balancing weight 26 is inserted in the left hand portion of the lever arm and is of sufficient weight so that when the weight 25 is placed at the zero graduation on the lever arm, that is to say, the graduation nearest the fulcrum point, the arm will balance and substantially no pressure will be exerted on the coated surface by the stylus.

The method of this invention comprises moving the coated test panel relatively to the stylus as the weight 25 is moved along the graduated portion of the lever arm and away from the fulcrum point to increase the pressure exerted by the stylus on the coating until the stylus penetrates the coating. In order to move the panel and to increase the pressure exerted on the coated surface simultaneously and in timed relation, a single electric motor 28 having a shaft 29 is provided. A strand 30, which is connected to the front end of the carriage 12, as shown in Fig. 1, is attached to the shaft 29, as may be best seen in Fig. 3. A second strand 31, which is connected to the weight 25, is fixed to a reel 32 which is keyed to the shaft 29. Thus, when the motor 28 is actuated, both strands will be drawn up, the strand 31 being drawn up more rapidly than the strand 30 since the diameter of the reel 32 is greater than the diameter of the shaft 29.

It will be noted that the strand 31 passes around a pulley 33 mounted on a shaft 34, and is attached to a projecting portion 35 on the lower side of the weight 25. The point at which this strand is attached to this block is of primary importance since the pulling force exerted on the block by the strand 31 must be parallel in direction to the plane of the upper surface of the lever arm 22; if the strand were attached at a point above this plane, the force exerted by the strand would tend not only to pull the weight forward, but also to exert a downward force, increasing thereby the pressure exerted by the stylus on the coating and thus rendering extremely difficult calculation of the total pressure exerted by the stylus 18 on the coating. Since this apparatus is designed to operate in a horizontal position, the proper point at which the strand 31 should be attached to the weight 25 may be said to be a point on a level with the axis of the fulcrum shaft 23 and the upper surface of the pulley 33 should be on the same level.

It has been stated that the strands are reeled in at differing speeds. This difference is advantageous since it is desirable that the weight travel a greater distance than the carriage in order to permit the leverage ratio to be increased as much as feasible; it will be obvious that the further the weight is moved away from the fulcrum point of the lever arm, the greater, proportionately, will be the pressure exerted by the stylus 18. Furthermore, by having a fairly long distance of travel, the position of the weight on the graduated portion of the arm is easier to ascertain. The relative size of the reel 32 to the shaft 29 is so selected that by the time the carriage 12 has traveled the length of the coated test panel relatively to the stylus 18, the weight 25 will have moved from the zero graduation on the lever arm to the maximum graduation on the lever arm.

Figure 2:
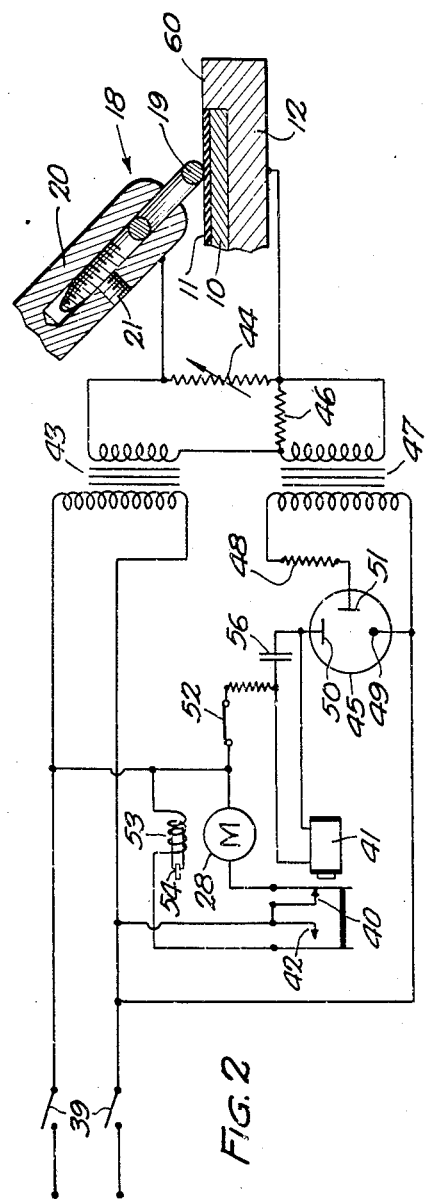
Fig. 2 shows diagrammatically the circuit used with this apparatus.

In the operation of this apparatus, a coated test panel is placed on the carriage 12 and the stylus 18 placed in contact with the left end of the panel. A switch 39, shown in Fig. 2, is then closed to connect the motor 28 to a 110 volt alternating current line. As may be seen in Fig. 2, one side of this line connects directly to the motor, while the other side makes connection with the motor through a normally closed relay contact 40. When current is applied to the motor, a potential is created between the eyelet 19 and the test panel 10, the voltage being reduced by a 13 to 1 ratio transformer 43 in order to obtain a voltage low enough not to penetrate a normal coating. Electrical connection to the eyelet is made through the lever arm which is made of metal. Electrical connection is made to the test panel through the metal carriage, wheels and track. A variable resistor 44 is connected between the eyelet and test panel in order to compensate for the conductivity of various coatings.

When the resistance of the coating between the eyelet and the test panel is sufficiently reduced by the eyelet penetrating the coating, sufficient current will then flow to a control electrode 51 of a trigger type cathode discharge tube 45, through a load resistor 46, step-up transformer 47, and current limiting resistor 48, to cause the gas in the tube to ionize, thus permitting current to flow from a cathode 49 to an anode 50. The cathode 49 is directly connected to one side of the 110 volt alternating current line so that when current flows from the cathode to the anode 50, a solenoid operated relay 41, which is connected to the anode 50, is actuated and opens the motor circuit by opening the normally closed contact 40. Connection to the other side of the 110 volt line is made through a normally closed switch 52. Simultaneously the relay 41 closes a circuit through a normally opened contact 42 to a second solenoid 53 which actuates a brake 54 which engages the shaft 29, thus stopping the motor instantly.

Sliding of the weight 25 due to momentum is negligible, and thus the position of the weight on the lever arm after the motor has stopped will be substantially the position it had when the coating was penetrated by the stylus. The postition of the weight being determined, it is then possible to accurately calculate the pressure exerted on the stylus by the coating and to evaluate the tested coating, or to compare it with other previously tested coatings.

In order to reset the apparatus after the stylus has penetrated the coating and to prepare it to make further tests, the operator lifts the stylus from the test panel, pulls the carriage 12 to the right, and then slides the weight 25 to the left to return it to the zero graduation. Since a cold cathode discharge tube, once ionized, will remain ionized even though the control electrode be de-energized, so long as a sufficient voltage is maintained between the cathode and the anode, the normally closed switch 52 is then opened to break the circuit to the anode, thus resetting the tube. A condenser 56 is connected between the relay 41 and the anode 50 to prevent chatter of the relay.

Since it is difficult to determine in advance, in all cases, the approximate pressure which will be required to penetrate a coating to be tested and to stop the motor, in order to prevent damage to the apparatus should the coating fail to be penetrated, and electrode 58, connected at its base to the track 14 which is connected to the control circuit, is positioned adjacent the right end of the lever arm, as shown in Fig. 1, and extends upwardly a sufficient distance so that the projecting portions 35 of the weight 25 will contact it. Since the lever arm and the weight are made of metal, and since the lever arm is also connected to the control circuit, when the projecting portion 35 contacts the electrode 58, a circuit is completed to operate the discharge tube 45 just as though the stylus had penetrated the coating, and therefore the motor is stopped.

In addition, a similar safety device is provided on the carriage 12. As may be seen in Fig. 1, the right hand end of the carriage is provided with a slightly raised portion 60. This raised portion serves two purposes. First, it prevents the test panel from being slid off the carriage as the carriage is moved relatively to the stylus during a test, and second, being metal and an integral part of the carriage, should the stylus contact this raised portion, the circuit to the discharge tube is completed in the same way as though the coating had been penertated, and the motor stopped.

It will be obvious that if insufficient weight is found to have been employed to penetrate the coating, additional weights may be stacked on the weight 25 until enough weight is had to create sufficient pressure on the coating to penetrate it in the course of a test run.

While but one embodiment of the present invention has been shown and described, it will be understood that many modifications and alterations may be made therein without departing from the spirit or scope of the present invention.

What is claimed is:

1. In an apparatus for testing a coating on a test panel, an arm, a pressure member fixed to said arm and in contact with said panel, means for effecting relative movement between said panel and said pressure member substantially in the plane of said panel, a weight associated with said arm and movable therealong to increase the pressure exerted by said pressure member on the coated panel, means for moving said weight to increase said pressure, and means responsive to said pressure member penetrating the coating on said panel for stopping said weight moving means.

2. In an apparatus for testing a coating on a test panel, an arm, a pressure member fixed to said arm and in contact with said panel, means for effecting relative movement between said panel and said pressure member substantially in the plane of said panel, a weight associated with said arm and movable therealong to increase the pressure exerted by said pressure member on the coated panel, means for moving said weight to increase said pressure, means responsive to said pressure member penetrating the coating on said panel for stopping said weight moving means, and means for stopping said apparatus, should said pressure member fail to penetrate said coating.

3. In an apparatus for testing a coating on a test panel, a pivotally mounted arm, a pressure member fixed to said arm and engageable with said coating on said panel, means for effecting relative movement between said panel and said pressure member substantially in the plane of said panel, means for increasing the pressure exerted by said pressure member on said panel as said panel is moved, and means responsive to said pressure member penetrating the coating on said panel for stopping said relative movement between said panel and said pressure member.

4. In an apparatus for testing a coating on a test panel, a pressure member, a motor for effecting relative movement between said panel and said pressure member substantially in the plane of said panel, means for creating an electrical potential between said pressure member and said panel, means for varying the potential between said pressure member and said panel for testing different thicknesses of coating, and means responsive to said pressure member penetrating the coating on said panel for stopping said motor.

5. In an apparatus for testing a coating on a test panel, means for exerting pressure on said coating to penetrate said coating, means for effecting relative movement between said panel and said pressure means substantially in the plane of said panel, and means actuated by said pressure means for stopping said relative movement, should said pressure means fail to penetrate said coating.

6. In an apparatus for testing a coating on a test panel, a pivotally mounted arm, a pressure member fixed to said arm and engageable with said coating on said panel, a weight on said arm, means for moving said weight along said arm to increase the pressure exerted by said pressure member on said panel, means for effecting relative movement between said panel and said pressure member substantially in the plane of said panel, and means responsive to said pressure member penetrating the coating on said panel for stopping said relative movement.

7. In an apparatus for testing a coating on a test panel, a pivotally mounted arm, a pressure member fixed to said arm and engageable with said coating on said panel, a weight on said arm, means for moving said weight along said arm to increase the pressure exerted by said pressure member on said panel, means for effecting relative movement between said panel and said pressure member substantially in the plane of said panel, means responsive to said pressure member penetrating the coating on said panel for stopping said relative movement, and means associated with said weight for stopping said weight moving means, should said pressure member fail to penetrate the coating.

8. In an apparatus for testing a coating on a test panel, a pressure member for penetrating said coating, means for effecting relative movement between said panel and said pressure member substantially in the plane of said panel, means for increasing the pressure exerted by said pressure member during said relative movement, means actuated by said pressure member penetrating said coating for stopping said panel, and means actuated by said pressure member should said pressure member fail to penetrate said panel for stopping said relative movement.

9. A testing apparatus for testing a coating on a base, a pressure member for engaging said coating, means for effecting relative movement between said base and said pressure member in the plane of said base, means for continuously increasing the pressure on said coating by the pressure member until said coating is penetrated, and means responsive to said pressure member penetrating said coating for stopping the relative movement between said coating and said pressure member.

GLEN R. SIMMONS.
HOWARD A. SIMMONS.